(12) United States Patent
Menezes

(10) Patent No.: US 6,199,984 B1
(45) Date of Patent: Mar. 13, 2001

(54) PROGRESSIVE ADDITION LENSES WITH VARYING POWER PROFILES

(75) Inventor: Edgar Menezes, Roanoke, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/271,119

(22) Filed: Mar. 17, 1999

(51) Int. Cl.⁷ .................................................. G02C 7/06
(52) U.S. Cl. ........................................ 351/169; 351/177
(58) Field of Search .................................. 351/169, 161, 351/168, 170–172, 177; 623/6

(56) References Cited

U.S. PATENT DOCUMENTS

| | | | |
|---|---|---|---|
| 3,711,191 | 1/1973 | Tagnon ................................. | 351/169 |
| 4,253,747 | 3/1981 | Maitenaz ............................... | 351/169 |
| 4,676,610 | 6/1987 | Barkan et al. ....................... | 351/169 |
| 4,859,261 | 8/1989 | Ace ....................................... | 156/102 |
| 4,906,090 | 3/1990 | Barth ..................................... | 351/169 |
| 4,946,270 | 8/1990 | Guilino et al. ....................... | 351/169 |
| 5,644,374 | 7/1997 | Mukaiyama et al. ................. | 351/169 |
| 5,771,089 | 6/1998 | Barth ..................................... | 351/169 |
| 5,844,657 | 12/1998 | Shiraynagi .......................... | 351/169 |
| 5,861,935 | 1/1999 | Morris et al. ........................ | 351/169 |
| 5,867,246 | 2/1999 | Edwards et al. .................... | 351/169 |

FOREIGN PATENT DOCUMENTS

| | | |
|---|---|---|
| 301962 | 5/1915 | (DE) . |
| 1 239 496 | 11/1967 | (DE) . |
| 191831 | 1/1989 | (EP) . |
| 578 833 A1 | 5/1993 | (EP) . |
| 809126 | 11/1997 | (EP) . |
| 809127 | 11/1997 | (EP) . |
| 414890 | 1/1998 | (EP) . |
| 857 993 | 8/1998 | (EP) . |
| 775007 | 5/1957 | (GB) . |
| 63-254415 | 10/1988 | (JP) . |
| 5303063 | 11/1993 | (JP) . |
| WO 90/12338 | 10/1990 | (WO) . |
| WO 98/12591 | 3/1998 | (WO) . |
| WO 98/22848 | 5/1998 | (WO) . |

Primary Examiner—Georgia Epps
Assistant Examiner—Jordan M. Schwartz
(74) Attorney, Agent, or Firm—Lois Gianneschi

(57) ABSTRACT

The invention provides lenses, as well as methods for their design and production, in which the power distribution between the distance and near vision zone substantially meets the requirements of the wearer's eye path and refractive power. This power distribution is obtained without introducing additional unwanted astigmatism.

21 Claims, 6 Drawing Sheets

PROGRESSIVE ADDITION LENSES WITH VARYING POWER PROFILES

FIELD OF THE INVENTION

The present invention relates to multifocal ophthalmic lenses. In particular, the invention provides lenses in which the channel power progression is customized to the wearer's viewing posture.

BACKGROUND OF THE INVENTION

The use of ophthalmic lenses for the correction of ametropia is well known. For example, multifocal lenses, such as progressive addition lenses ("PALs"), are used for the treatment of presbyopia. Typically, a PAL provides distance, intermediate, and near vision zones in a gradual, continuous progression of increasing dioptric power. PALs are appealing to the wearer because the lenses are free of the visible ledges between the zones of differing optical power that are found in other types of multifocal lenses, such as bifocals and trifocals.

As the wearer's eyes move from the distance, through the intermediate, and into the near vision zones of a PAL, the wearer's eyes converge bringing the pupils closer together. Ideally, the design of a PAL would be such that the power progression from the distance zone, through the intermediate and to the near zone matches the wearer's requirements as the eye scans the lens. However, in the design of conventional PAL's, a trade-off is made between the power progression distribution and the level of unwanted astigmatism of the lens.

Unwanted astigmatism is astigmatism introduced or caused by one or more of the lens surfaces resulting in image blurring, distorting, and shifting for the lens wearer. In order to reduce unwanted astigmatism, the power progression is distributed over a greater length in some designs. Due to this lengthened distribution, the power distribution may not meet the wearer's requirements and the wearer may have to alter their natural viewing posture, or head and eye position, in order to use the intermediate and near vision zones of the lens. In those lens designs in which the power progression distribution is over a shorter length, a more natural viewing posture may be provided, but the level of unwanted astigmatism is increased reducing the useable area of the lens.

Thus, a need exists for a PAL that provides a power progression distribution tailored to the requirements of the wearer's natural eye path, but that does not increase the lens' unwanted astigmatism. Additionally, a need exists for a method to determine the preferred viewing posture of the wearer so that the wearer is not required to make significant viewing posture adaptations to use the lens.

DESCRIPTION OF THE INVENTION AND ITS PREFERRED EMBODIMENTS

Figure 1:
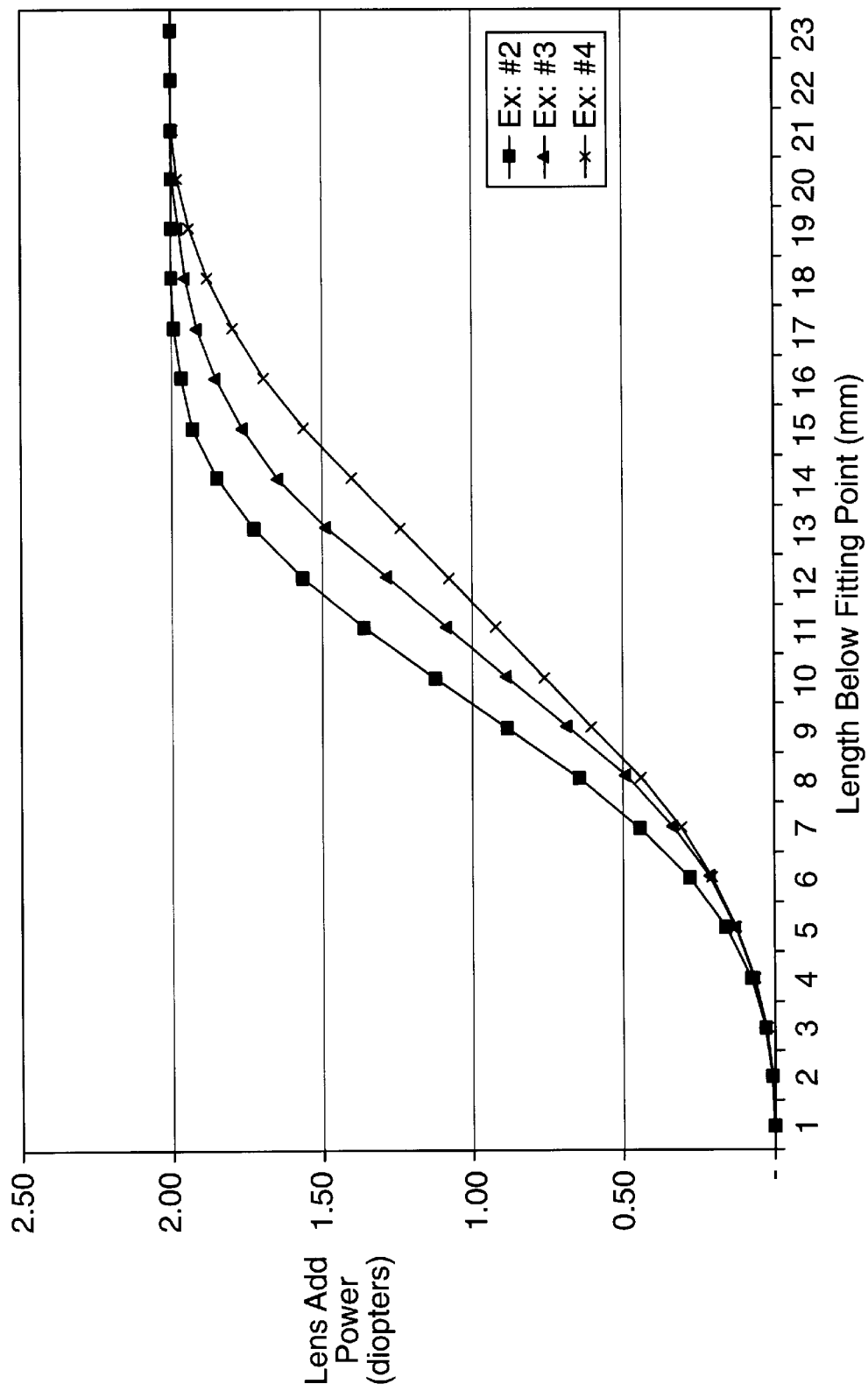
FIG. 1 is a diagrammatic representation of the lens channel power profiles of the lenses of Examples 2, 3 and 4.

The present invention provides lenses, as well as methods for their design and production, in which the power distribution between the distance and near vision zone substantially meets the requirements of the wearer's eye path and refractive power. This power distribution is obtained without reducing the useable lens surface by introducing additional unwanted astigmatism.

In one embodiment, the invention provides a lens comprising, consisting essentially of, and consisting of a first surface having a first channel and a first channel power profile and a second surface having a second channel and a second channel power profile, wherein the channel power profile of the lens is the vector sum of the channel power profiles. By "lens" is meant any ophthalmic lens including, without limitation, spectacle lenses, contact lenses, intraocular lenses and the like. Preferably, the lens of the invention is a spectacle lens.

The surfaces used in the lens of the invention may be progressive addition surfaces or regressive surfaces. By "progressive addition surface" is meant a continuous, aspheric surface having distance and near viewing or vision zones, and a zone of increasing dioptric power connecting the distance and near zones. By "regressive surface" is meant a continuous, aspheric surface having zones for distance and near viewing or vision, and a zone of decreasing dioptric power connecting the distance and near zones. By "channel" is meant the corridor of vision that is free of unwanted astigmatism of about 0.75 diopters or greater when the wearer's eye is scanning through the intermediate vision zone to the near vision zone and back. By "channel power profile" or "power profile" is meant the power distribution along the channel length. By "channel length" is meant the distance from the lens' fitting point to a point along the channel at which the dioptric add power is about 85 percent of the dioptric add power of the surface. By "fitting point" is meant the point on a lens aligned with the wearer's pupil in its distance viewing position when the wearer is looking straight ahead. By "dioptric add power" is meant the amount of dioptric power difference between the near and far vision zones of a lens or surface.

It is one discovery of the invention that a channel power profile suited to a specific lens wearer's requirements may be achieved by using at least two surfaces, each having a channel power profile. The channel power profiles may be substantially the same or different. The channels of the surfaces may be aligned or displaced. By aligned is meant that the major reference point of one channel is superposed on that of the other channel. By "major reference point" is meant the point of intersection of the primary meridian with the beginning of the channel, x=0, y=0. By displaced is meant that major reference point of one channel is displaced downwardly with respect to that of the other channel. Either embodiment permits a large range of channel power profiles while limiting the number of surfaces required.

In general, the channel power profile, P(x,y), of a progressive lens may be calculated as a vector sum of the profiles of each surface of the lens. For example, for a lens with two progressive surfaces, S' and S", which surfaces have channel power profiles P'(x,y) and P"(x,y), respectively, the power profile for the lens may be calculated according to the following equation:

$$P(x,y) = P'(x,y) + P''(x-dx, y-dy) \quad (1)$$

wherein dx and dy are the x and y components of the displacement of the fitting point of surface S" with respect to surface S'.

For example, S' may be a convex progressive surface and S" a concave progressive surface. Surface S" may be displaced vertically downwards relative to S' by a distance dy. If L' is the channel length of surface S', L" is the channel length of the surface S", and L">L', then the channel length L of the lens formed by combining surfaces S' and S" is calculated as L=L"+dy. The channel power profile will change in accordance with equation 1. If however, L"<L'+dy, the displacement of S" downwards relative to S' will not change the channel length of the lens which will remain L=L', but will change the channel power profile within the channel. In the case in which surfaces S' and S" are not displaced, or in which dx=dy=0, the channel length L is the greater of L' and L" and the power profile will change to be a vector sum according to equation 1.

Thus, either or both the channel power profiles of the individual surfaces and displacement distances may be selected so that one can independently customize the channel power profile for a particular wearer. Either or both the channel profile difference and displacement will also misalign the areas of maximum unwanted astigmatism of the surfaces and the overall maximum astigmatism of the lens will be lower than the sum of the individual surfaces.

Preferably, two progressive surfaces, one concave and one convex surface, with the same or similar channel power profiles are used and the varying channel power profile of the lens is obtained by displacement. The displacement of the surfaces' channels must be done in a manner so that either or, preferably both, the channels' centerlines and the channels' lateral edges' alignment is maintained. In this way, introduction of an unacceptable level of distortion in the channel may be avoided. Further, the displacement must be carried out so that unacceptable prism power, which may act to disrupt the wearer's vision, is not introduced. More preferably, the displacement is along the centerlines of the surfaces' channels with maintenance of the centerlines' alignment. The displacement may be about 0.1 mm to about 20 mm, preferably about 1 mm to about 10 mm, more preferably about 2 mm to about 7 mm.

In another embodiment, the invention provides a method for producing a lens comprising, consisting essentially of, and consisting of the steps of: a.) measuring a lens wearer's eye path and refractive power requirement while the wearer is viewing an object at a distance, an intermediate, and a near position; and b.) providing a lens with a channel power profile based on the lens wearer's eye path and refractive requirement. By "eye path" is meant the course over a progressive or regressive surface that is aligned with the lens wearer's pupil as the eye scans from the fitting point to the wearer's natural near vision position.

In the method of the invention, the channel power profile for the lens wearer is obtained by determining the wearer's eye path and the refractive power required by the wearer along that eye path. The eye path may be determined by any known technique. For example, the wearer may be provided with one or more lenses. The wearer then views at least three objects at distance, intermediate, and near locations while maintaining a natural viewing posture. It will be recognized that the more measurements made along the eye path, the greater the accuracy of the power profile obtained will be. Thus, preferably at least three points are measured along the eye path. The pupil position of the eye is recorded, for example by marking the lens surface, along the eye path. Conventional eye charts or fixation targets may be used to ensure that a stable pupil position is maintained during the measurement.

The refractive power required by the wearer at each of the measured locations may be determined by using techniques well known in the art including, without limitation, the use of trial lenses or a phoropter. The channel power profile required by the wearer is then calculated from the refractive power measurements at each position along the eye path. One convenient method that may be used is to graphically connect the refractive power measurements by a smooth curve when plotted as a function of length below the fitting point. One ordinarily skilled in the art will recognize that any of a variety of other methods may be used, such as fitting using the best equation through the measurements, all of which are within the scope of the invention. The eye path measurements for a lens wearer preferably is conducted separately for each eye because each of the wearer's eyes usually has a unique eye path.

The lenses and methods of the invention may be used to provide a variety of power profiles for one lens wearer, each suited to a specific task to be carried out by the wearer. For example, displacement may increase the channel profile length so that a power plateau for intermediate distance tasks is provided. Alternatively, the profile may be shortened to provide an elongated near vision zone for reading.

The progressive or regressive surfaces used in the lenses of the invention may be designed and optimized by any known method including, without limitation, the use of commercially available design software. The surfaces may be on a convex surface, a concave surface, a surface intermediate the concave and convex surface, or combinations thereof. One ordinarily skilled in the art will recognize that, if a progressive surface forms the convex surface of the lens, the distance vision zone curvature will be less than that of the near zone curvature. Conversely, if the progressive surface is the lens' concave surface, the distance curvature will be greater than that of the near zone.

The channel power profile for each surface may be selected from any of the known power profiles including, without limitation, linear, spline, trigonometric, and the like. The channel power profile for each surface may be the same or different. In all cases, the channel power profile resulting for the lens must substantially meet the wearer's eye path and refractive requirements when the wearer is maintaining a natural viewing posture.

If surfaces are used in which the power progression decreases from the far vision to the near vision zone, the dioptric add power of the surface will be less than zero. The dioptric add power of each of the surface used in the invention is selected so that, when the surfaces are combined into a lens, the add power of the lens will equal that needed to correct the lens wearer's near vision acuity.

The dioptric add power of each surface used in the invention may individually be about −3.00 to about +6.00 diopters, preferably about −2.00 diopters to about +5.00 diopters, more preferably about −1.00 to about +4.00 diopters. The surfaces each may contain spherical power, cylinder power and axis, or combinations thereof.

The lenses of the invention may be fabricated by any convenient means and constructed of any known material suitable for production of ophthalmic lenses. Suitable materials include, without limitation, polycarbonate, allyl diglycol, polymethacrylate, and the like. Such materials are either commercially available or methods for their production are known. Further, the lenses may be produced by any conventional lens fabrication technique including, without limitation grinding, whole lens casting, molding, thermoforming, laminating, surface casting, or combinations thereof. Casting may be carried out by any means, but preferably is performed by surface casting including, without limitation, as disclosed in U.S. Pat. Nos. 5,147,585, 5,178,800, 5,219,497, 5,316,702, 5,358,672, 5,480,600, 5,512,371, 5,531,940, 5,702,819, and 5,793,465 incorporated herein in their entireties by reference.

The invention will be clarified further by the following, non-limiting examples.

EXAMPLES

Example 1

A lens wearer's pupil positions are photographed while the wearer is viewing objects at distance, intermediate, and near positions. The wearer wears single vision lenses for distance and intermediate vision and reading lenses for near vision. For distance viewing, a Snellen eye chart is placed 3 m from the wearer's pupils and for intermediate viewing, the chart is placed on a table that is 64 mm from the pupils. For near vision, the wearer is placed approximately at the wearer's natural reading position, which for the wearer of Example 1 is approximately 40 mm from the pupils. The wearer is found to require 0.00, 1.00, and 2.00 diopters sphere power for the distance, intermediate, and near vision, respectively. The pupil positions, as projected on the convex surface of the lens, for intermediate and near viewing are found to be 8.5 mm and 17.5 mm vertically below the pupil position during distance viewing, respectively Thus, the point at which the lens wearer will require the center of the near vision zone to be located is approximately 4 mm below the channel end, making the channel length 17.5 mm−4.0 mm=13.5 mm.

Example 2

Figure 2:
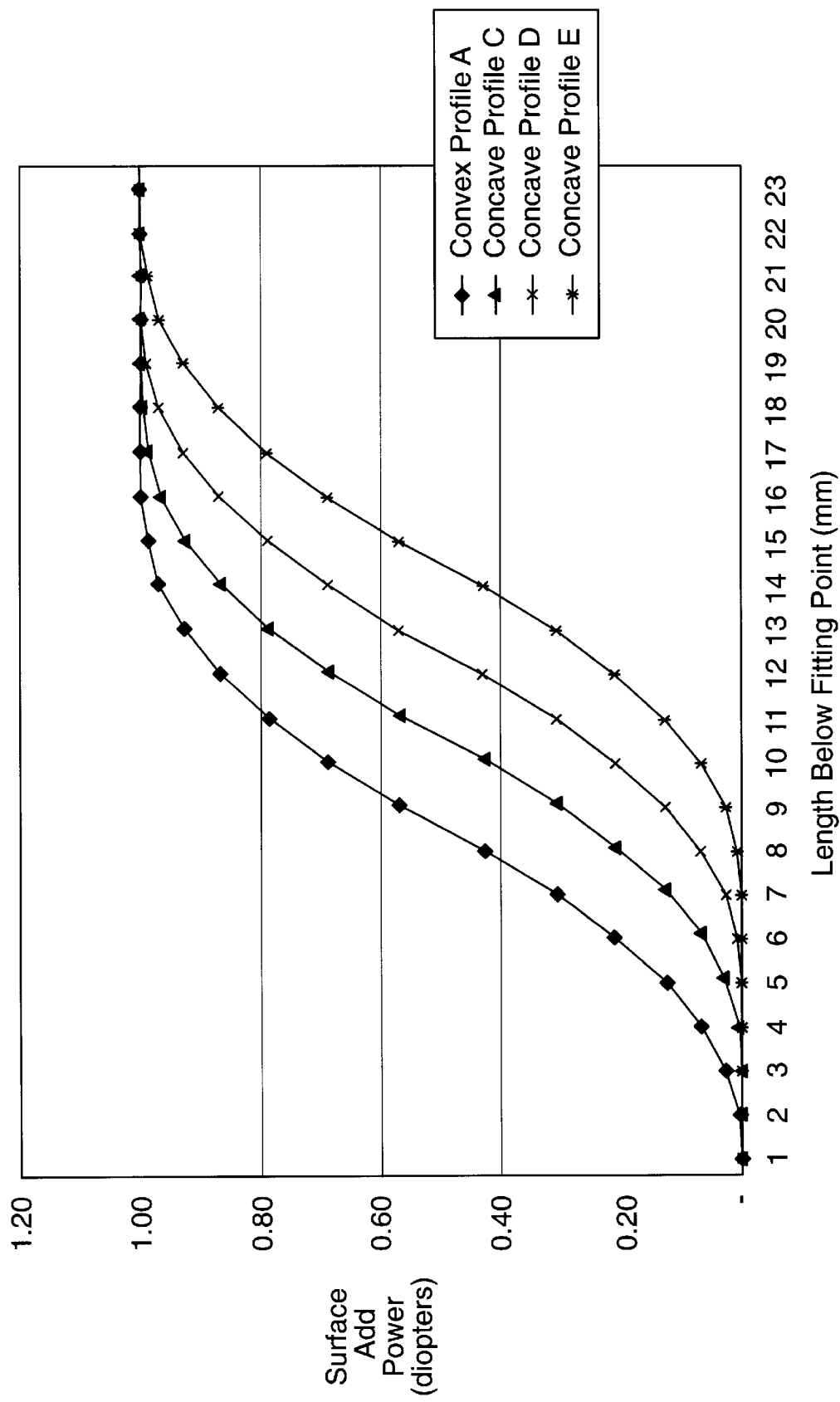
FIG. 2 is a diagrammatic representation of the surface channel power profiles of the lenses of Examples 2, 3, and 4.

Convex and concave progressive surfaces are provided. The convex surface has a distance curvature of 6.00 diopters and near zone curvature of 7.00 diopters. The channel power profile of the convex surface is shown in FIG. 2 as convex profile A. The channel length of this surface is 11 mm. The concave surface has a distance zone curvature of 6.00 diopters and a near zone curvature of 5.00 diopters. The channel power profile for the concave surface is shown in FIG. 2 as concave profile C and the channel length is 13 mm. The concave surface channel's major reference point is displaced downward 2 mm relative to the convex surface optical center. The resulting lens has a distance power and add power of 0.00 diopters and 2.00 diopters, respectively, with 1.00 diopters of add power contributed by each surface. The resulting channel power profile matches that required by the lens wearer of Example 1 and is depicted in FIG. 1. The channel length of the lens is 13.55 mm and the location of the intermediate vision zone is 8.5 mm below the fitting point, consistent with the pupil measurements of the wearer in Example 1.

Examples 3–4

Two lens wearers are measured using the procedure of Example 1 and their pupil location measurements for intermediate and near tasks are found to be 9.5 mm and 19 mm for the wearer of Example 3 and 10.5 and 21 mm for the wearer of Example 4. Both require 0.00, 1.00, and 2.00 diopters power correction for distance, intermediate and near vision, respectively.

Lenses according to the invention are made for the wearers. The convex progressive surface of each lens has a distance zone curvature of 6.00 diopters and a near vision zone curvature of 7.00 diopters. The channel power profiles of the convex surfaces are shown in FIG. 2 as convex profile A and the channel lengths are 11 mm. The concave progressive surfaces have distance zone curvatures of 6.00 diopters and near zone curvatures of 5.00 diopters. The channel power profiles of the concave surfaces are shown in FIG. 2 as concave profiles D and E, respectively, and the channel lengths are 11 mm. The major reference point of each lens' concave surface channel is displaced downward relative to the convex surface major reference point by 4 mm and 6 mm for the lens of Examples 3 and 4, respectively. The resulting channel power profiles of the lenses are shown in FIG. 1. The channel lengths are 15 mm and 17 mm for Example 3 and Example 4, respectively, as required by the pupil positions of the lenses' wearers for near viewing and the locations of the intermediate zones are 9.5 mm and 10.5 mm, respectively, below the fitting point.

Examples 5–6

Two lens wearers are measured by the procedure of Example 1 and their pupil location measurements for intermediate and near tasks are determined to be 5 mm and 15 mm below the fitting point for the wearer of Example 5 and 7.5 and 15 mm for the wearer of Example 6. Both wearers require 0.00 diopters, 1.00 diopters, and 2.00 diopters power correction for distance, intermediate and near vision, but the Example 5 wearer prefers a more rapid progression of power at the top of the channel than does the Example 6 wearer.

Figure 3:
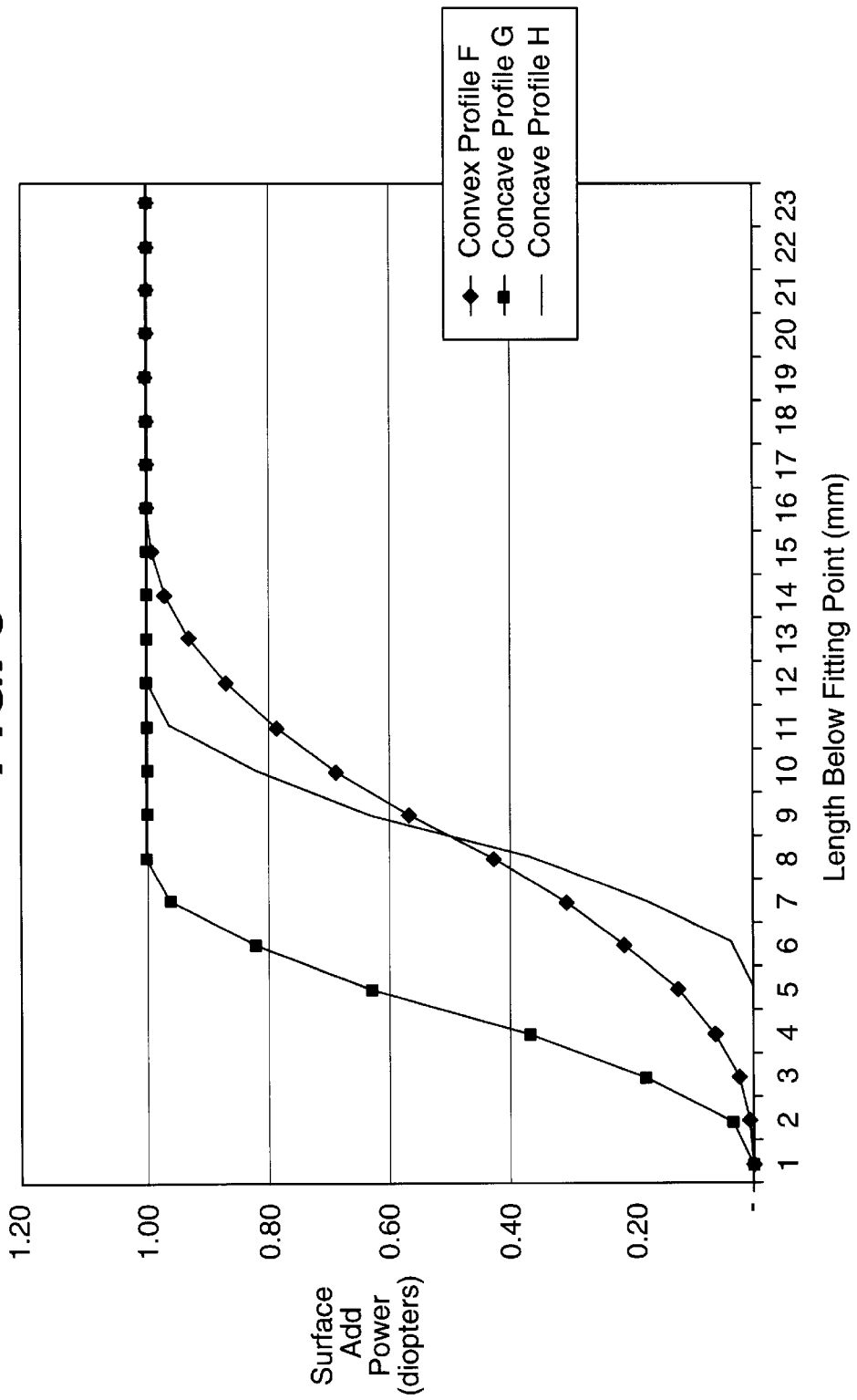
FIG. 3 is a diagrammatic representation of the surface channel power profiles of the lenses of Examples 5 and 6.
Figure 4:
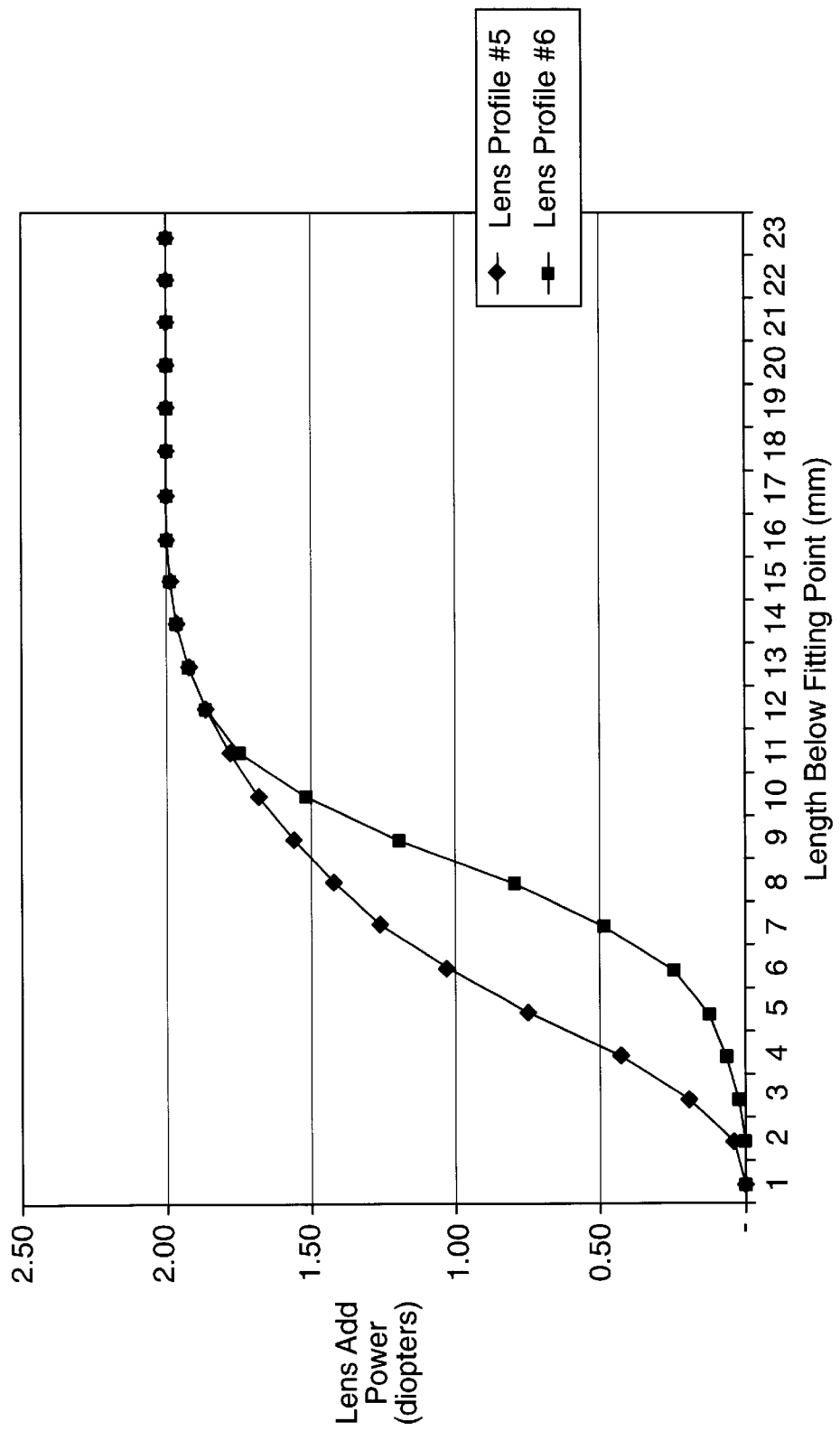
FIG. 4 is a diagrammatic representation of the lens channel power profiles of the lenses of Examples 5 and 6.

FIG. 4 illustrates the lens channel profiles of the lenses made for these wearers. The convex surface of each lens has a distance zone curvature of 6.00 diopters and near zone curvature of 7.00 diopters and is shown in FIG. 3 as convex profile F. The channel length is 11 mm. The concave surfaces have distance curvatures of 6.00 diopters and near zone curvature of 5.00 diopters. The channel power profiles for the concave surfaces are shown in FIG. 3 as concave profiles G and H, respectively. The channel length is 5.5 mm for both concave surfaces. The optical center of the concave surface for Example 6 is coincident with that of the convex surface. In Example 5, the optical center of the concave surface is displaced 4 mm downward from that of the convex surface. The resulting distance and add powers for both lenses are 0.00 diopters and 2.00 diopters, with 1.00 diopters of add power contributed by each surface. The channel power profiles of the lenses, shown in FIG. 4, are matched to the pupil position and power progression preferences of each wearer. Thus, although the channel lengths for the lenses are 11 mm, the locations of the intermediate vision zones are 5 mm and 7.5 mm below the fitting point.

Example 7

Figure 5:
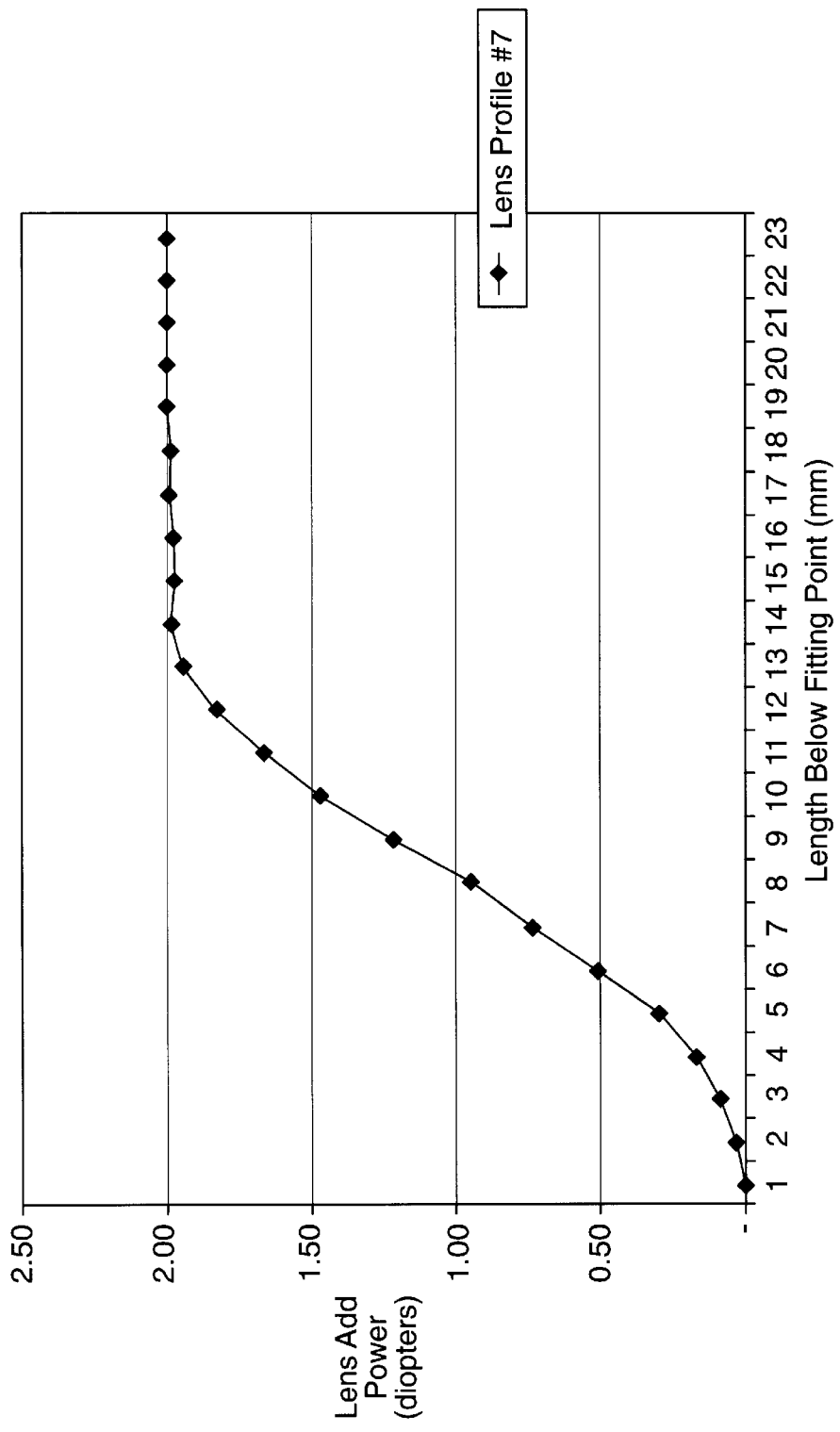
FIG. 5 is a diagrammatic representation of the lens channel power profile of the lens of Example 7.

A lens wearer is measured using the procedure of Example 1 and the pupil locations measurements for intermediate and near tasks are determined to be 7 mm and 15.5 mm, receptively and the channel length is 15.5 mm−4.00 mm=11.5 mm. The wearer requires 0.00, 1.00, and 2.00 diopters power correction for distance, intermediate and near vision. The lens channel power profile suited to this wearer is shown in FIG. 5.

Figure 6:
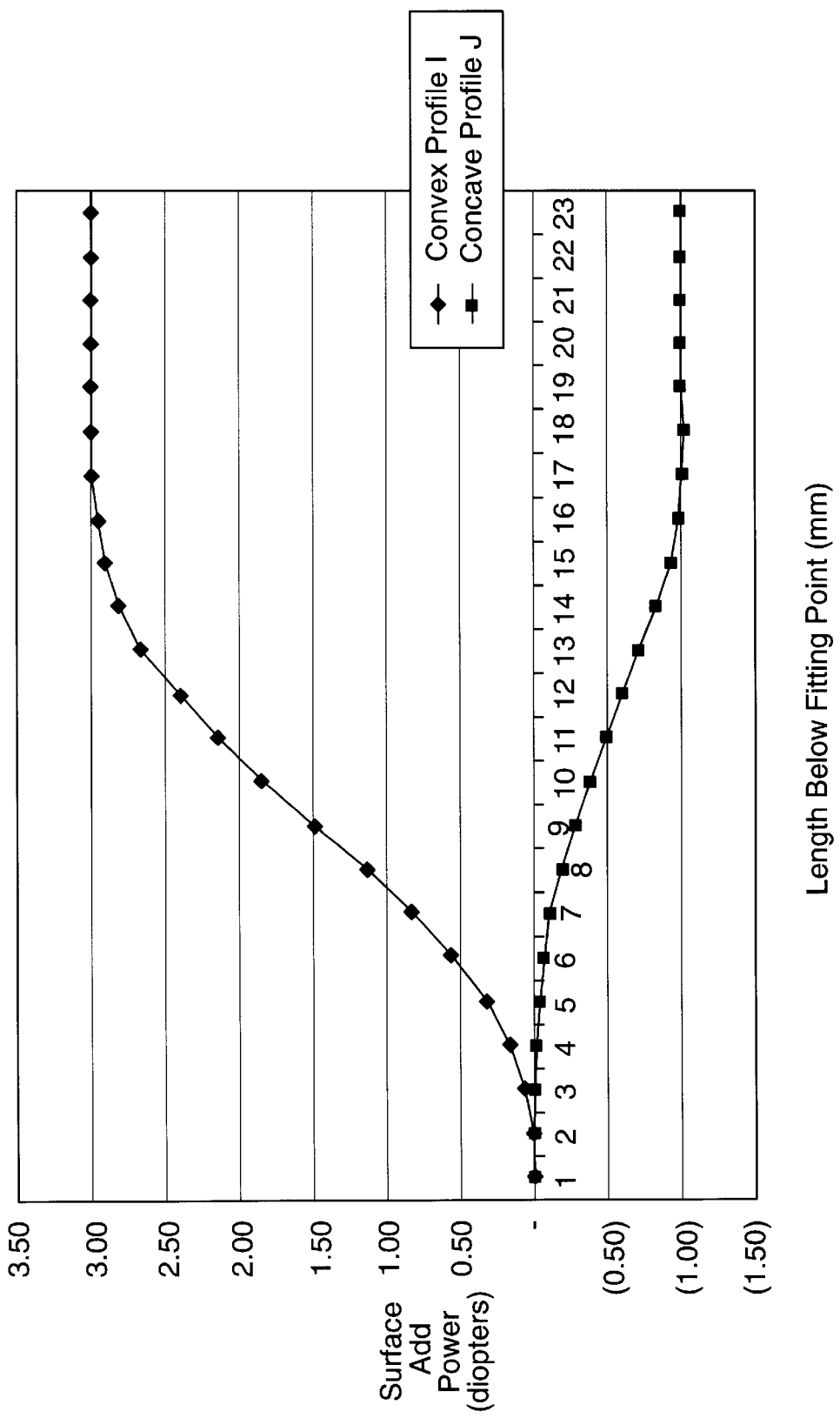
FIG. 6 is a diagrammatic representation of the surface channel power profile of the lens of Example 7.

A lens is formed with a convex progressive surface and a concave regressive surface. The convex surface has a distance zone curvature of 6.00 diopters and near zone curvature of 9.00 diopters with a channel power profile shown in FIG. 6 as convex profile I. The channel length is 14 mm. The concave surface has a distance zone curvature of 6.00 diopters and near zone curvature of 7.00 diopters with a channel power profile as shown in FIG. 6 as concave profile J. The channel length is 13.5 mm. The concave surface optical center is displaced downward 2 mm relative to that of the convex surface. The resulting distance and add powers of the lens are 0.00 and 2.00 diopters, respectively with 3.00 diopters of add contributed by the convex surface and −1.00 diopters add contributed by the concave surface. The resulting channel power profile is shown in FIG. 5. The channel length is 11.5 mm and the location of the intermediate vision zone is mm below the fitting point meeting the pupil measurements of the wearer.

What is claimed is:

1. A spectacle lens comprising a first surface having a first channel and a first channel power profile and a second surface having a second channel and a second channel power profile, wherein the channel power profile of the lens is the vector sum of the channel power profiles and the first channel and the second channel are displaced.

2. The lens of claim 1, wherein the first surface is a convex progressive surface and the second surface is a concave progressive surface.

3. The lens of claim 1, wherein the first and second channel power profiles are substantially the same.

4. The lens of claim 1, wherein the first and second channel power profiles are different.

5. The lens of claim 2, wherein the first and second channel power profiles are substantially the same.

6. The lens of claim 5, wherein the displacement is about 0.1 mm to about 20 mm.

7. A spectacle lens comprising a first surface having a first channel and a first channel power profile and a second surface having a second channel and a second channel power profile, wherein the channel power profile of the lens is the vector sum of the channel power profiles and wherein the first channel and the second channel are displaced about 0.1 mm to about 20 mm.

8. The lens of claim 7, wherein the first surface is a convex progressive surface and the second surface is a concave progressive surface.

9. The lens of claim 7, wherein the first and second channel power profiles are substantially the same.

10. The lens of claim 7, wherein the first and second channel power profiles are different.

11. A method for producing a spectacle lens comprising the steps of: a.) measuring a lens wearer's eye path and refractive power requirement while the wearer is viewing an object at a distance, an intermediate, and a near position; and b.) providing a lens with a channel power profile based on the lens wearer's eye path and refractive requirement.

12. The method of claim 11, wherein step b.) is performed by providing a lens comprising a first surface having a first channel and a first channel power profile and a second surface having a second channel and a second channel power profile, wherein the channel power profile of the lens is the vector sum of the channel power profiles.

13. The method of claim 12, wherein the first and second channel are aligned.

14. The method of claim 12, wherein the first and second channel are displaced.

15. The method of claim 12, wherein the first surface is a convex progressive surface and the second surface is a concave progressive surface.

16. The method of claim 12, wherein the first and second channel power profiles are substantially the same.

17. The method of claim 12, wherein the first and second channel power profiles are different.

18. The method of claim 15, wherein the first and second channel power profiles are substantially the same.

19. The method of claim 18, wherein the first and the second channel are displaced.

20. The method of claim 19, wherein the displacement is about 0.1 mm to about 20 mm.

21. A lens produced by the process of claim 11, 12, 13, 14, 16, 17, or 20.

* * * * *